June 6, 1944.  R. M. CRITCHFIELD ET AL  2,350,390
HORN CONTROL SYSTEM
Filed May 27, 1940  2 Sheets-Sheet 1

Inventors
Robert M. Critchfield,
Paul L. Schneider &
Brooks H. Short
Blackmor, Spencer & Flint
Attorneys Patented June 6, 1944

2,350,390

UNITED STATES PATENT OFFICE 2,350,390

HORN CONTROL SYSTEM

Robert M. Critchfield, Paul L. Schneider, and Brooks H. Short, Anderson, Ind., assignors to General Motors Corporation, Detroit, Mich., a corporation of Delaware Application May 27, 1940, Serial No. 337,338

4 Claims. (Cl. 177—7)

This invention relates to control systems and more specifically to means for controlling the audible volume of a device for impressing sound waves upon the air or controlling the intensity of sound emitted by a warning signal. From the initiation of the use of vehicles it has always been necessary to provide thereon some means for warning pedestrians or other drivers of the proximity of a vehicle. In the earlier model cars this warning signal was an air-operated horn having very low intensity and therefore not of an annoying nature. However, with the design and provision of the modern horn the volume was so increased, that, utilizing an intensity sufficient to act as a warning signal at high speeds, it has been found that this intensity is entirely too loud for use at low speeds and in substantially quiet surroundings. The present type of warning device which is supplied in what is termed a tuned pair of horns and the volume emitted thereby is more than sufficient if the car is traveling slowly or in a quiet neighborhood. However, if only a low intensity of sound is provided from the signal, then, as the noise level and speed of the car is increased, it will be insufficient to warn drivers ahead of the approach and the desire to pass of a driver coming from the rear.

It is therefore an object of our invention to provide means to vary the intensity of the sound emitted by the horn, dependent upon the ambient noise level and also upon the speed of the vehicle. In other words, if the car is being operated in a locality adjacent manufacturing buildings where there is a considerable amount of noise, the amount of volume should be increased from a low level to overcome the noise, even though the car is being operated at a comparatively low speed. On the other hand, if the car is being operated at high speed in outlying or rural districts, the volume should be increased so that sound will be audible to another driver on the highway.

It is therefore a further object of our invention to provide means for controlling the volume of the horn, one dependent upon noise level and a second and independent one subject to car speed.

It is a further object of our invention to provide such apparatus previously described which will be substantial, simple to manufacture, and will require no service adjustments.

With these and other objects in view, our invention will be better understood by referring to the following specification and claims and the illustrations in the accompanying drawings, in which:

Figure 1:
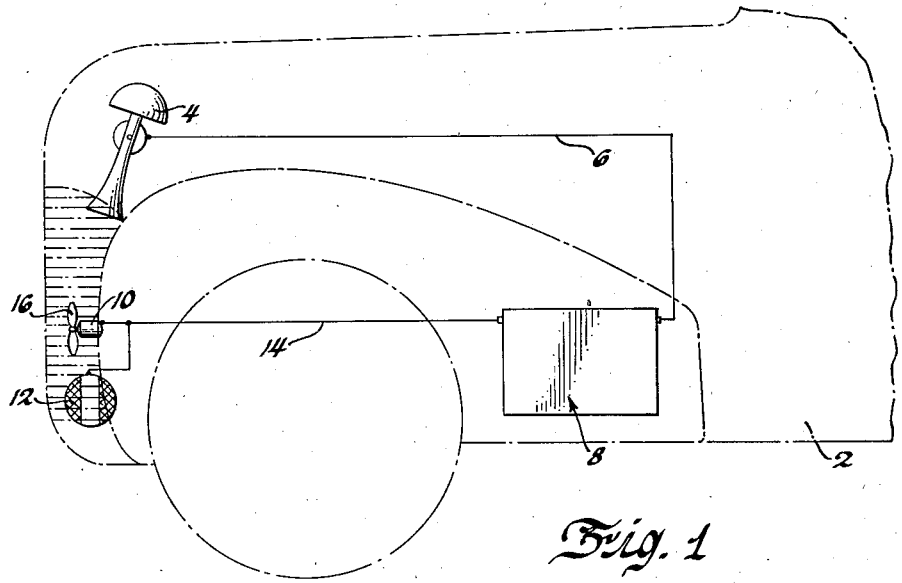
Figure 1 shows a partial side elevation of a vehicle with a schematic diagram of our invention applied thereto.
Figure 2:
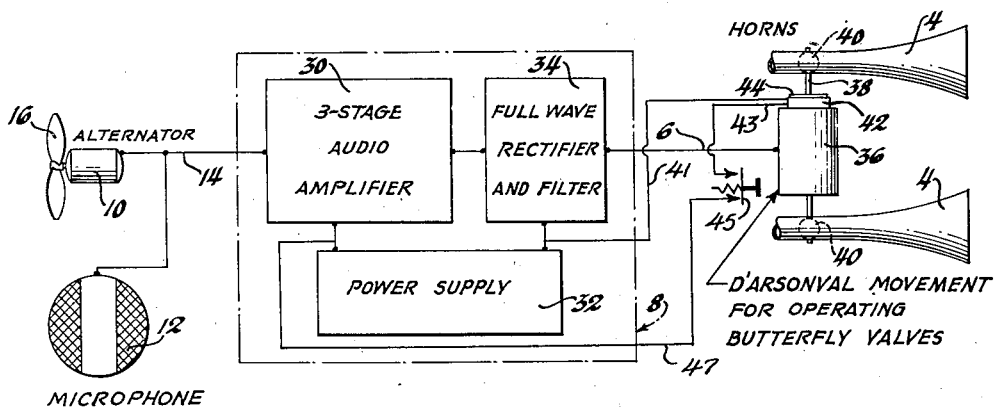
Figure 2 shows a schematic diagram of the various elements of our invention.

Referring now more specifically to Figure 1, the dotted outline shows the forward end of a vehicle 2 upon which is mounted a pair of horns 4 adjacent the forward end which are connected by a cable 6 to the amplifying device indicated generally by the box 8 which in turn is connected to a small alternator 10 and a microphone 12 by a cable 14, the alternator 10 being driven by a small propeller 16 by the air passing through the grille of the vehicle. Broadly, therefore, the invention has as it main parts means for applying a certain generated current to amplifying means, the output of which is provided to vary the intensity emitted from a horn or other warning element. As will be evident from this figure, as the speed of the car increases the propeller 16 will be rotated at a higher rate, and, since it drives a small alternator 10, the output of this alternator will increase with speed. Also, as the sound present in a particular locality increases, the output of the microphone 12 will be increased to also impress a higher voltage upon the amplifying means 8. The alternator is so designed that its output will be comparable to the output of the microphone so that neither one will dominate in the result but each will contribute a controlling factor. Thus as the amount of current supplied to cable 14 varies, the amount of amplified current in cable 6 will vary, and, through means to be described, will alter the output of the horns 4.

Figure 3:
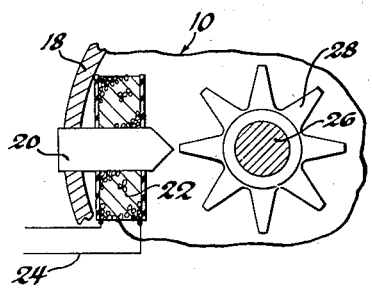
Figure 3 shows an enlarged sectional view taken through the alternator which is operated by the speed of the vehicle.

The alternator, which is more specifically shown in Figure 3, is mounted directly behind the grille of the car and the air passing through the grille and through the radiator causes the small propeller or paddle to be rotated at various speeds, dependent upon the car speed. The shaft 26 is mounted rotatably in a small metallic housing 18 and secured to one portion thereof is a small alnico bar magnet 20. This is best shown in Figure 3. Carried by the bar magnet 20 is a coil 22 which is directly connected by suitable lines 24 to the cable 14. Mounted upon the rotatable shaft 26 is a magnetic gear 28, the points of the teeth approaching the end of the alnico magnet. Thus as the shaft 26 and the gear 28 are rotated, the magnetic field between the gear teeth and magnet is varied to cause a pulsating current to be generated in the coil 22, the output of which of course depends upon the speed of rotation of the shaft 26. If the shaft 26 rotates at a high speed, considerable voltage is generated and applied to the lines 24, or if the shaft 26 rotates at a low speed, only a small voltage is applied thereto.

The microphone 12 is also mounted directly behind the grille as shown and may be of any desired commercial construction to give an output at substantially high noise levels comparable to the output of the small generator. This microphone is also placed so that it will not be particularly affected by the noise of the motor, but will more readily pick up noises in the vicinity. The outputs of both the microphone and the alternator are applied through cable 14 to a small audio amplifier 30 which is supported within the box 8. This audio amplifier is supplied by power from any suitable power supply such as 32 and the output thereof is directly connected to a rectifier and filter 34. These elements are all supported within the cabinet 8 and are of a conventional commercial design. The output of the rectifier is connected through cable 6 to a magnetic control 36 similar to a D'Arsonval galvanometer whereby the different strength of the field will rotate a shaft 38 within the coil to different angular degrees. In this manner, as the voltage applied to the coil in the galvanometer 36 varies, the shaft 38 will assume different angular positions.

Connected to the outer ends of the shaft 38 are small butterfly valves 40 which are located in the throats of the horns 4. There is also applied to one end of the galvanometer 36 a small coil 42 which cooperates with a clutch disc 44 on the shaft 38 and when energized attracts the disc 44 to lock the shaft 38 against rotation. The coil 42 is connected by line 41 to a source of power such as one terminal of a battery in the power supply unit 32 and by a second line 43 with one side of a switch 45 which is moved by actuation of a conventional horn button, the opposite side of said switch being connected to the other terminal of the battery in unit 32 by grounding or line 47. Thus, when the horn button is depressed to energize the horns the coil 42 will be energized to lock the butterfly valves 40 in the position that they occupy at the moment and prevent any turning during horn energization. It will be evident that the position of the butterfly valves in the horn throats will vary the amount of air and consequently volume of sound emitted by the horns when operated.

The operation of the device is as follows:

As the car proceeds through a certain area the propeller 16 will be rotated and a certain generator output will be applied to the cable 14 therefrom and at the same time the noise present in the particular location will cause the microphone to apply an output to the same cable. These two voltages combine and the resultant voltage is amplified and rectified in the cabinet 8 by the members 30 and 34 respectively. This amplified and rectified output is then applied to the galvanometer coil in 36 the the butterfly valves 40 float freely at a certain predetermined position in the horn throat, dependent upon the amount of voltage applied. If now the operator desires to energize the horns, the horn button is depressed and by this action the coil 42 is energized through circuit 41, 42, 43, 45, and 47. This locks the butterfly valves 40 in the position in which they were floating, dependent upon the speed and noise, and operates the horns whose volume of course will be comparable to the speed and the noise level of that location.

As soon as the horn button is released the coil 42 will be deenergized and the butterfly valves will again float, their position being altered by any change in the noise level or speed of the vehicle. In this manner we provide a means for altering the volume of the horns so that it is no more than necessary to overcome the speed or noise of the location and will not be such as to cause annoyance to persons in that locality.

Figure 4:
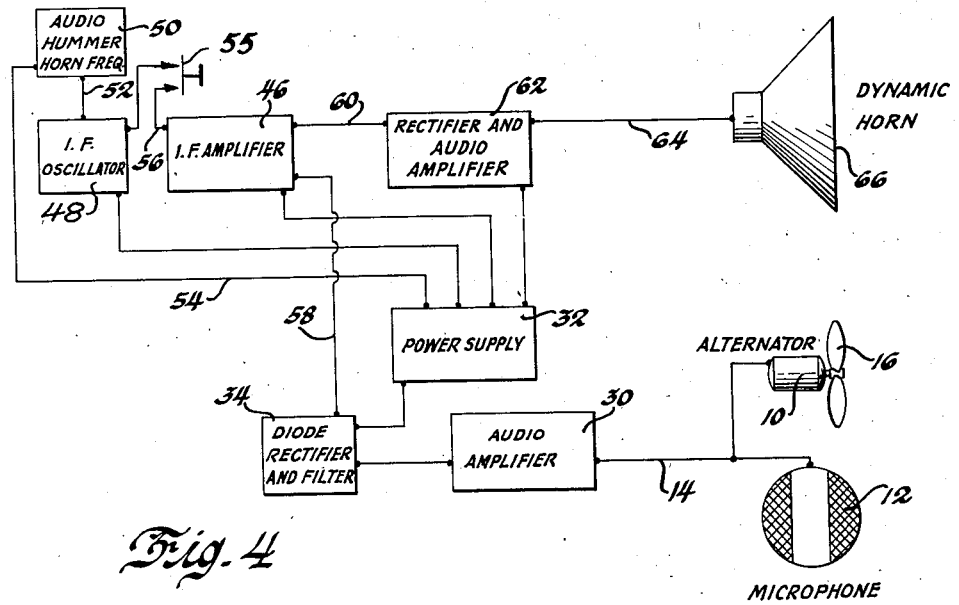
Figure 4 shows a schematic diagram of a modified form of our invention.

Going now to the modified form of our invention, schematically illustrated in Figure 4 is a similar propeller 16 which drives a small generator 18 or alternator and also a similar microphone 12, both of which supply a cable 14 which takes the combined output and applies the same to a similar audio amplifier 30 of any commercial design. This output, as in the previous instance, is supplied through a rectifier and filter 34 which is also supplied from a similar power supply 32. However, in this instance instead of applying the rectifier and filter output to a galvanometer, it is applied to an intermediate frequency amplifier to vary the grid bias thereof. This particular system has a small oscillator 48 which generates a high frequency above audibility similar to an intermediate frequency oscillator in a radio receiver; for example, a frequency of somewhere around 400 kilocycles per second. This goes out as a straight carrier wave.

There is also provided an audio hummer 50 generating a frequency of audible nature which would give a horn tone. This is connected to the oscillator 48 by a cable 52 and also to the power supply 32 by a cable 54. This connection provides for a modulation of the carrier wave by a hummer oscillator in the nature of audible horn frequency. The output of the I.F. oscillator which is modulated by the audio hummer is applied to the intermediate frequency amplifier through cable 56 having the conventional horn switch 55 therein and is amplified to a desired degree. As before mentioned, the output of the diode rectifier 34 is also applied to the intermediate frequency amplifier through cable 58 and its action is to vary the output of the I.F. amplifier by varying the grid voltage thereof. Therefore the cable 58 is directly connected to the grid of this amplifier. The output of the amplifier is connected through cable 60 to a further rectifier and audio amplifier 62 and its output is applied through cable 64 to a dynamic horn such as 66.

In this instance the ambient sound level and speed which affect the microphone and alternator respectively apply a voltage to the cable 14 which is amplified by 30 and rectified by 34 and applied to the grid of the I.F. amplifier 46. When the switch 55 is closed to operate the horn, the audio hummer modulates the I.F. oscillator 48 and this modulated wave is applied to the intermediate frequency amplifier 46, the output of which is determined by the grid bias which as before stated will be set by the voltater in the cable 58, dependent upon the alternator and microphone. This voltage then passes through the rectifier 62 and is applied to the horn 66. It will thus be seen that also in this instance the microphone and the alternator vary the amount of voltage applied to the dynamic horn and thus vary the sound output, dependent upon the factors previously described.

Figure 5:
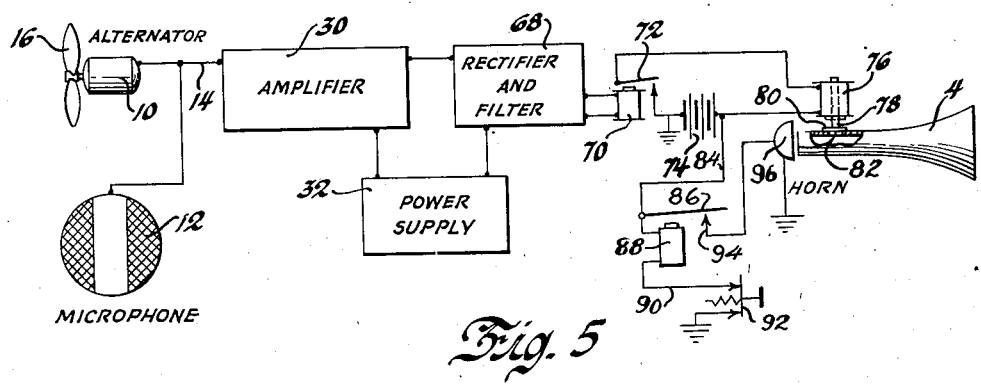
Figure 5 shows a still further modified form thereof.

Passing now to the modification shown in Figure 5, the microphone 12 and alternator 10 are exactly the same as those previously described. The combined output is again applied through a cable 14 to an amplifier 30 which is supplied by power from a power supply 32. The output of the amplifier is again rectified and filtered through member 68 and the output thereof is applied to a small solenoid 70 which operates a movable switch arm 72 connected in a closed circuit with a battery 74 and a second solenoid 76. The latter solenoid has as a core a movable rod 78 having applied to one end thereof a small disc 80 which cooperates with a small opening 82 at one side of the horn throat 4. A line 84 is connected to the battery 74 and extends to a movable switch arm 86 and a relay coil 88. The coil 88 is connected by line 90 to the horn switch 92 and thence to ground. The movable switch arm 86 cooperates with a stationary switch contact 94 connected to the horn operating mechanism 96. If the solenoid 70 is energized the circuit will be closed to solenoid 76 which will withdraw the plunger from the opening 82 in the side of the horn throat and cause a different tone in the horn when it is operated from that when the same is closed. In this instance we have only two different tones, one loud and one soft, depending upon the setting of the output of the rectifier. In instances where the outputs of the alternator and microphone are not sufficient to energize the solenoid 70, the horn when energized will operate as though complete, but when the output is sufficient the solenoid will withdraw the disc 80 from the opening 82 and change the tone of the horn. In this manner we may obtain what is known as city and country horn volume.

We claim:

1. In a control system, a motor vehicle, a warning horn mounted on the vehicle, a wind driven generator mounted on the vehicle in such a position that air will flow thereover, the speed of the air being determined by the speed of the vehicle, a microphone mounted on the vehicle to be sensitive to the noise level surrounding the same, amplifying means, means for feeding the combined output of the generator and the microphone to said amplifier, a valve in the horn to vary the tone thereof, means to alter the position of the valve and means connecting said last named means to the amplifier output whereby the valve position and horn tone will vary dependent upon the amplifier output as regulated by the combination of the microphone and generator.

2. In a control system for application to a motor vehicle, a sound generator, means for varying the response of said generator, a plurality of means for generating control voltage, one by air velocity and one by ambient noise level, the means for voltage generation comprising a current generating device and a sound responsive device coordinated so that neither device dominates the other, amplifying means connected to the output of the plurality of means for voltage generation and means connecting the amplifying means to the varying means to change the sound output dependent on the voltage generated by the plurality of means for voltage generation.

3. In a control system for application to a motor vehicle, a sound generating horn, magnetic means for varying the horn output, a plurality of voltage generating means, one dependent on air flow and one upon ambient sound, an amplifier connected to both the voltage generating means and to the magnetic varying means to cause variation of the sound output dependent upon the voltage generated.

4. In a control system, a vehicle, a sound generating horn mounted upon the vehicle, a valve in the horn for changing the volume thereof, magnetic means for varying the position of the valve, a plurality of voltage generating means mounted on the vehicle, one operated by air velocity and one by ambient noise level, means connecting the output of the voltage generating means to the magnetic means for positioning the valve to change the sound output and further magnetic means to lock the valve in a given position when the horn is being actuated so that the volume of sound will not change during one operation.

ROBERT M. CRITCHFIELD.
PAUL L. SCHNEIDER.
BROOKS H. SHORT.